UNITED STATES PATENT OFFICE.

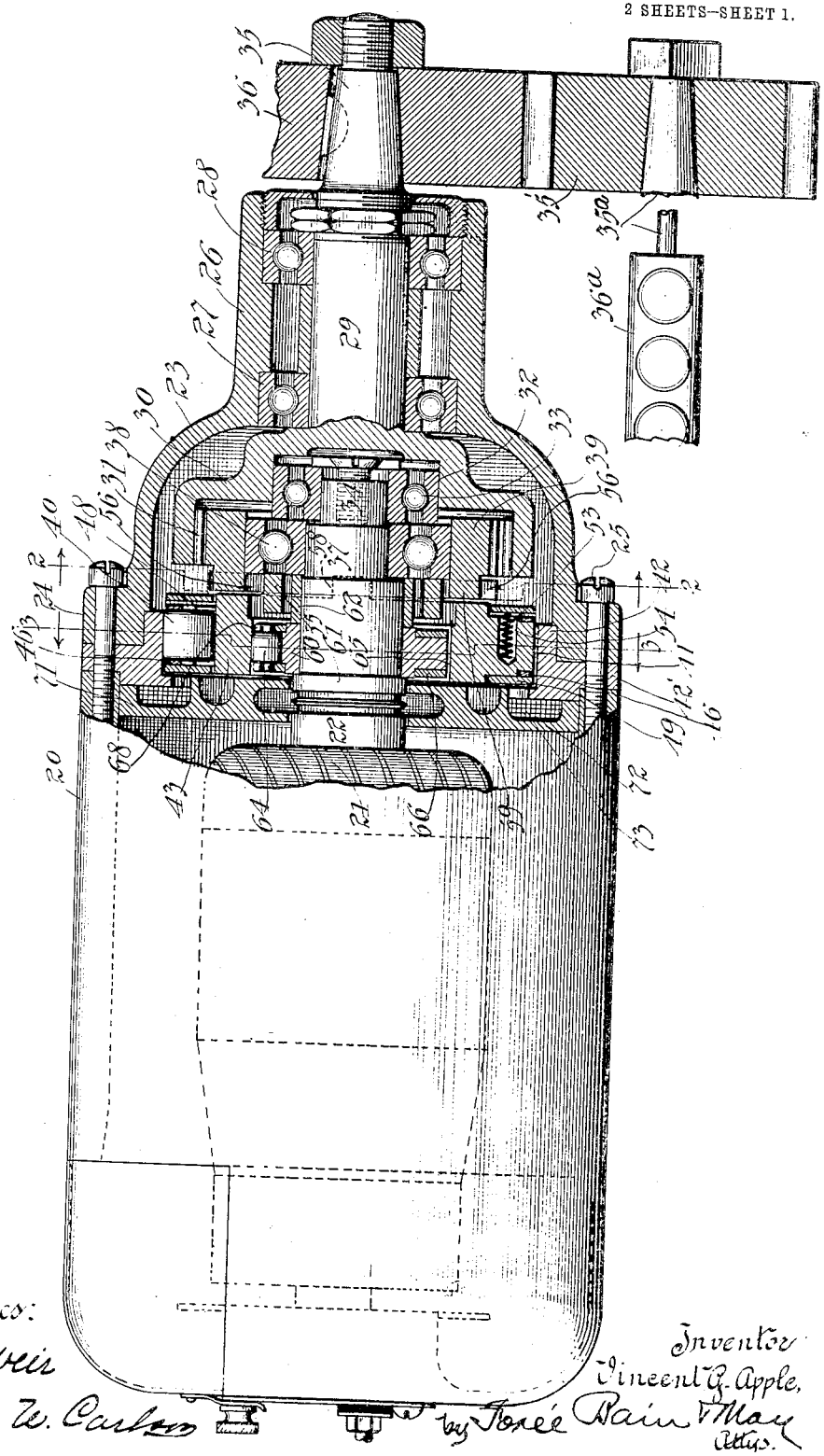

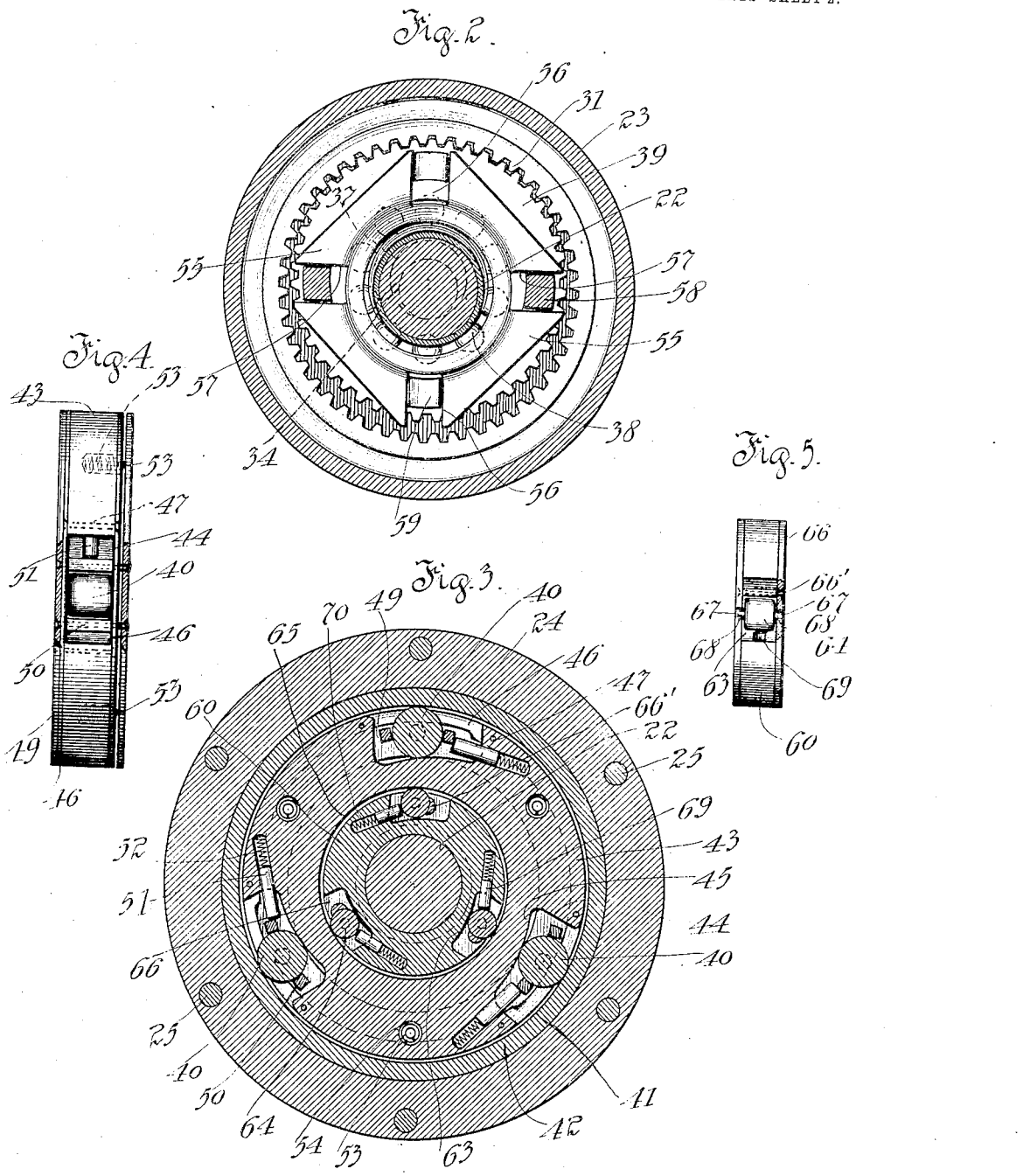

VINCENT G. APPLE, OF DAYTON, OHIO, ASSIGNOR TO THE APPLE ELECTRIC COMPANY, OF DAYTON, OHIO, A CORPORATION OF OHIO.

POWER-TRANSMISSION GEARING.

1,118,617.      Specification of Letters Patent.      Patented Nov. 24, 1914.

Application filed May 19, 1914. Serial No. 839,577.

*To all whom it may concern:*

Be it known that I, VINCENT G. APPLE, a citizen of the United States, residing at Dayton, in the county of Montgomery and State of Ohio, have invented certain new and useful Improvements in Power-Transmission Gearing, of which the following is a specification.

This invention relates to improvements in power transmitting gearing and more particularly to a transmission for interposition between a dynamo, adapted to serve both as a generator and motor, and an internal combustion engine.

One of the objects of my invention is to provide such a gearing, of rugged, efficient, and compact form, occupying a minimum amount of space, and of a character to transmit at a comparatively large reduction in speed when the dynamo is starting the engine and automatically shiftable to provide direct connection when the engine is driving the dynamo as a generator.

Another object of my invention is to provide such a gearing in which the interposition of the reduced speed gearing is caused by a clutch responsive to an electromagnet.

Another object of my invention is to provide such a mechanism in which all the gears and clutch mechanisms rotate in unison without relative rotation or connection with other parts when the connection is direct for driving the dynamo as a generator, thus eliminating friction and noise in the gearing.

Referring to the drawings, Figure 1 is a vertical, axial, sectional view of my improved gearing showing it mounted upon a dynamo. Fig. 2 is a vertical, transverse sectional view on the line 2—2 of Fig. 1. Fig. 3 is a vertical, transverse, sectional view on the line 3—3 of Fig. 1. Fig. 4 is a side view of the outer clutch member showing parts broken away. Fig. 5 is a side view of the inner clutch member showing parts broken away, and Fig. 6 is a detail section of the roller actuating plunger and spring.

In the drawings 20 indicates the frame of a motor generator, inclosing the armature 21 carried on the shaft 22. A bell shaped casing 23 is flanged as at 24 for connection by means of the screws 25 to an end of the frame 20. The outwardly extending end 26 of the bell shaped casing is reduced in diameter and carries two annular bearings 27 and 28 in which is journaled the short shaft 29 carrying at its inner end a double stepped cup shaped member 30, the outer step of which is provided with an internal gear 31 and the inner step 32 of which carries the annular bearing 33 the inner race of which is carried on the outer end 34 of the shaft 22. The outer end of the short shaft 29 is tapered at 35 to receive the pinion 36, which engages the gear 35′ carried by the crank shaft 35ᵃ of the internal combustion engine 36ᵃ. Adjacent the end section 34 of the shaft 22 is positioned an eccentric 37 upon which is fixed the inner race of the annular bearing 38 carrying upon its outer race the pinion 39 meshing with the internal gear 31. The pinion 39 and internal gear 31 form the well known type of eccentric reduction gearing, the pinion having a less number of teeth than the internal gear so that when oscillated through the medium of the rotating eccentric 37 and prevented from actual rotation it causes the slow rotation of the internal gear driving through to the gear or sprocket 36.

In order to give the oscillating spur gear 39 a "toe-hold", preventing rotation but permitting oscillation, when the dynamo is acting as a motor to start an engine, I have provided an outer roller clutch member shown in Fig. 4, the rollers 40 of which run within the race-way 41 formed on the inner face of flange 42 carried by the annular ring 42′ interposed between the flange 24 on the casing 23 and the forward end wall of the frame 20. This outer roller clutch member as illustrated in Fig. 4, comprises a solid ring 43 of a thickness approximately equal to the length of the rollers 40 and pocketed as at 44 to receive the rollers, which in the present instance, are three in number. The inner wall 45 of each of the pockets 44 is inclined so as to wedge the roller outward as it travels from the large end of the pocket upward to the smaller end in a manner well known in the ordinary form of roller clutch. At each side of the body ring 43 near the outer edge is provided an annular ring 46 held in place thereon by the transverse pins 47 and extending radially beyond and over the axial outwardly extending nubs 48 of the roller 40. A second pair of annular rings 49, of a width approximately equal to the diameter of the rollers, are positioned at each side of the base ring 43 and are secured together by the transverse bars 50 which extend in pairs through the pockets 44 at each side of the rollers 40. These two rings are spaced apart by the boss 50 a distance somewhat greater than the combined thickness of the base ring 43 and the two rings 46, for a purpose to be described. The outer clutch member therefore comprises in its essential parts the pocket carrying base ring 43 and the two outer rings secured together by the transverse bars 50 between each pair of which is carried a roller. Relative rotation of the outer rings and base ring causes the rollers to travel from one end of their pockets to the other. Movement of the rollers into the smaller ends of their pockets is resisted by the spring pressed plungers 51 sunk in openings 52 in the base ring extending out of the pockets on lines approximately radial to the axes of the roller. The normal position therefore of the roller is in the larger ends of the pockets where they are out of contact at least out of frictional contact with the race way 41. A plurality of springs 53 positioned in axial openings 54 in the base ring 43 press against the outer of the two rings 49 so that the inner ring is held in close contact with the inner face of the base ring 43 and the outer of the two rings 49 is spaced away therefrom as shown in Fig. 4, for a purpose to be described.

A universal connection between the outer clutch member and the oscillating gear is provided through the medium of a plate 55 of a shape resembling in general a Maltese cross and having pairs of opposite slots 56 and 57. The slots 57 are engaged by the two forwardly extending lugs 58 integral with the base ring 43 of the outer clutch member. The other two slots 56 are engaged by the rearwardly extending lugs 59 carried by the oscillating pinion 39. When the outer clutch member is locked to the frame it is obvious that an oscillating movement of the pinion is permitted by the lugs sliding within the slots but actual rotation is prevented and the internal gear 31 will be rotated. Within the outer clutch ring is positioned a second roller clutch mechanism as indicated in Fig. 5. The body part or main ring 60 of this clutch makes a tight fit upon the shaft 22 abutting at its rear edge against the shoulder 61 and positioned from the inner race of the annular ball bearing 38 by a collar 62. This body ring is provided with wedge shaped pockets 63 receiving the rollers 64 which engage with the race way 65 formed in the inner surface of the outer clutch member. A pair of annular rings 66 are slidably positioned at the sides of the body part 60 and are joined by the transverse pins 66'. The rollers are provided at each end with projecting pins 67 journaled in the radial slots 68. The rollers together with their rings are pressed toward the narrow end of the wedge shaped pockets by the spring impelled plungers 69 carried in the recesses 70 formed in the body ring 60 and extending from the pockets in a direction approximately radial to the axes of the rollers. At the rear of the annular ring 43 is positioned a second ring 71 carried within the bore of the frame 20 and provided with an annular groove or socket 72 within which is positioned an electromagnet coil 73. This coil is connected in the "starting" circuit so that when current is directed from the storage batteries into the dynamo for utilizing the same as a starting motor the coil is energized for a purpose to be described.

The operation of the mechanism is as follows. When starting an internal combustion engine current is directed through the field and armature of the dynamo and through the electromagnet coil 73. Rotation of the armature (looking at Fig. 3) in a clockwise direction causes the wabbling or oscillation of the pinion 39. Assuming that the pinion is held from rotation it is obvious that the internal gear 31 will be slowly but continuously rotated in the same direction transmitting power through to the gear or sprocket 36, connected with the shaft 35ª of the engine. The inner clutch member rotating with the shaft in a clockwise direction, the rollers 64 tend to run into the larger ends of the pockets, and the clutch is therefore inactive. As before stated, the spring actuated plungers 51 tend normally to throw the rollers 40 into the larger ends of their pockets and if it were not for the action of the electromagnet the rollers would not clutch the race way 41 but instead permit the slow backward rotation of the spur gear. The electromagnet, however, being energized draws inwardly the inner of the two rings 49 against the magnet ring 71 causing a rearward drag upon the rollers, overcoming the action of the spring pressed plungers 51 forcing the rollers into the smaller ends of their pockets and consequently locking the outer clutch against the frame of the motor. This permits of the transmission of power through from the armature shaft 22 to the gear shaft 35 for starting of the engine.

When the internal combustion engine takes up its cycle of operation its speed is, of course, accelerated, and the shaft 29 then becomes the driver instead of the driven. The rotation of the shaft 29 together with its internal gear 31 carries around with it the pinion 39 and through the medium of the universal connection the outer clutch member. This rotation of the outer clutch member in the clockwise direction aids the action of the spring pressed plungers 51 and causes the rollers 40 to run into the larger ends of their pockets freeing the clutch from the motor frame. The race way 65 then rotating in the clockwise direction with the aid of the spring pressed plungers 69 carries the rollers 64 into the smaller ends of their pockets locking the two parts together and causing the armature shaft 22 to become the driven member directly connected with the driver 29. Obviously as long as the magnet 73 is energized there will be a tendency of the rollers 40 and the rings 49 to drag backward against the positive driving action. When the engine takes up its cycle of operation, however, the starting circuit is broken and the dynamo then utilized as a generator for recharging the batteries and supplying current for the lights, ignition, etc. The deënergization of the magnet 73 permits the springs 53 to come into play overcoming any residual magnetism in the magnet 73 as well as any tendency of the field magnet to hold the rings inward, snapping the two rings away from the magnet frame. This action frees all the rotating parts from any connection with the frame and permits the entire mechanism to rotate as a unit with the armature shaft.

What I claim is:—

1. A power transmitting gearing comprising primary and secondary rotatable members; an eccentric, carried by the primary rotatable member; a spur gear, rotatably mounted on the eccentric; an internal gear meshing with the spur gear and having a different number of teeth therefrom; one of said gears being associated with the secondary rotatable member, a normally inoperative roller clutch, associated with the other gear and magnetic means for actuating said roller clutch.

2. A power transmitting gearing comprising primary and secondary rotatable members; an eccentric carried by the primary rotatable member; a spur gear, rotatably mounted on the eccentric; an internal gear, carried by the secondary rotatable member meshing with the spur gear and having a different number of teeth therefrom; a clutch member, universally connected with said spur gear; a one way clutch carried by said primary member and engaging with said clutch member; a stationary casing for said gearing; a normally inoperative clutch carried by said clutch member; and magnetic means, for engaging said last mentioned clutch with the casing.

3. A power transmitting gearing comprising primary and secondary rotatable members; speed reducing gearing, interposed between the two rotatable members and operable upon the stoppage of one of its parts; a normally inoperative roller clutch associated with said last mentioned part and magnetic means for operating said roller clutch.

4. A power transmitting gearing comprising primary and secondary rotatable members; a speed reducing gearing, interposed between said members and operable upon the stoppage of one of its parts; a normally inoperative clutch associated with said last mentioned part; magnetic means for operating said clutch; a movable part on said clutch adapted under the influence of said magnet to contact therewith, and springs for normally holding said movable parts out of contact with the magnet.

5. A power transmitting gearing comprising primary and secondary rotatable members; an eccentric, carried by one of said members; a spur gear, rotatably mounted on the eccentric; an internal gear meshing with the spur gear and carried by the other member; magnetically operable means, for holding said spur gear from rotation; and a one way clutch between said spur gear and eccentric carrying rotatable member.

6. A power transmitting gearing comprising primary and secondary rotatable members; an eccentric, carried by one of said members; a spur gear, rotatably mounted on said eccentric; an internal gear meshing with the spur gear and carried by the other member; a clutch ring, universally connected to said spur gear; magnetically operable means, for holding said clutch ring from rotation; and a one way roller clutch, between said clutch ring and eccentric carrying shaft.

7. A power transmitting gearing comprising primary and secondary rotatable members; an eccentric, carried by one of said members; a spur gear, rotatably mounted on the eccentric; an internal gear meshing with the spur gear and carried by the other member; a clutch ring, universally connected with said spur gear; a normally inoperative roller clutch, for locking said ring against rotation in one direction; magnetic means, for operating said ring holding means; and means, for locking said ring to the eccentric carrying shaft.

8. A power transmitting gearing comprising primary and secondary rotatable members; a speed reducing gearing, between said members operable upon the stoppage of one of its parts, a normally inoperative one way roller clutch, associated with said part and adapted when operated to engage a stationary part; magnetic means, for operating said roller clutch; and a second roller clutch, between said first mentioned part and one of the rotatable members.

9. A power transmitting gearing comprising primary and secondary rotatable members; a speed reducing gearing, connecting said members and operable upon the stoppage of one of its parts; a normally inoperative one way roller clutch associated with said part and when operated adapted to engage a stationary raceway; an axially movable ring, on said clutch for causing the engagement of said rollers with the race way; magnetic means, for moving said ring axially into contact with the magnet; and resilient means, for moving the ring axially in the opposite direction on the deëngerization of the magnet.

In testimony whereof I hereunto set my hand in the presence of two subscribing witnesses.

VINCENT G. APPLE.

In the presence of—
N. E. SNYDER,
E. M. EARNHART.